US010614609B2

(12) United States Patent
Shih et al.

(10) Patent No.: US 10,614,609 B2
(45) Date of Patent: Apr. 7, 2020

(54) METHOD AND APPARATUS FOR REDUCTION OF ARTIFACTS AT DISCONTINUOUS BOUNDARIES IN CODED VIRTUAL-REALITY IMAGES

(71) Applicant: MEDIATEK INC., Hsin-Chu (TW)

(72) Inventors: Cheng-Hsuan Shih, Hsin-Chu (TW); Chia-Ying Li, Hsin-Chu (TW); Ya-Hsuan Lee, Hsin-Chu (TW); Hung-Chih Lin, Hsin-Chu (TW); Jian-Liang Lin, Hsin-Chu (TW); Shen-Kai Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/034,601

(22) Filed: Jul. 13, 2018

(65) Prior Publication Data

US 2019/0026934 A1 Jan. 24, 2019

Related U.S. Application Data

(60) Provisional application No. 62/534,275, filed on Jul. 19, 2017.

(51) Int. Cl.
*G06T 15/00* (2011.01)
*H04N 19/124* (2014.01)
(Continued)

(52) U.S. Cl.
CPC .......... *G06T 15/005* (2013.01); *G06T 19/003* (2013.01); *H04N 19/124* (2014.11);
(Continued)

(58) Field of Classification Search
CPC ...... G06T 15/005; G06T 19/00; G06T 19/003
See application file for complete search history.

(56) References Cited

U.S. PATENT DOCUMENTS

2010/0278277 A1* 11/2010 Park ..................... H04L 1/0631
375/267
2012/0002723 A1 1/2012 Arakawa et al.
(Continued)

FOREIGN PATENT DOCUMENTS

CN 101002479 A 7/2007
CN 105554506 A 5/2016
(Continued)

*Primary Examiner* — Charles Tseng
(74) *Attorney, Agent, or Firm* — McClure, Qualey & Rodack, LLP

(57) ABSTRACT

Methods and apparatus of processing 360-degree virtual reality images are disclosed. According to one method, a 2D (two-dimensional) frame is divided into multiple blocks. The multiple blocks are encoded or decoded using quantization parameters by restricting a delta quantization parameter to be within a threshold for any two blocks corresponding to two neighboring blocks on a 3D sphere. According to another embodiment, one or more guard bands are added to one or more edges that are discontinuous in the 2D frame but continuous in the 3D sphere. Fade-out process is applied to said one or more guard bands to generate one or more faded guard bands. At the decoder side, the reconstructed 2D frame is generated from the decoded extended 2D frame by cropping said one or more decoded faded guard bands or by blending said one or more decoded faded guard bands and reconstructed duplicated areas.

11 Claims, 18 Drawing Sheets

(51) Int. Cl.
*H04N 19/86* (2014.01)
*H04N 19/176* (2014.01)
*H04N 19/154* (2014.01)
*G06T 19/00* (2011.01)
*H04N 19/597* (2014.01)

(52) U.S. Cl.
CPC ......... *H04N 19/154* (2014.11); *H04N 19/176* (2014.11); *H04N 19/86* (2014.11); *G06T 2200/04* (2013.01); *H04N 19/597* (2014.11)

(56) References Cited

U.S. PATENT DOCUMENTS

2018/0288356 A1* 10/2018 Ray .................. H04N 19/176
2019/0005683 A1* 1/2019 Van Der Auwera ........................ H04N 19/119

FOREIGN PATENT DOCUMENTS

| | | |
|---|---|---|
| CN | 105894449 A | 8/2016 |
| KR | 2011-0055820 A | 5/2011 |
| WO | 2016/064862 A1 | 4/2016 |

\* cited by examiner

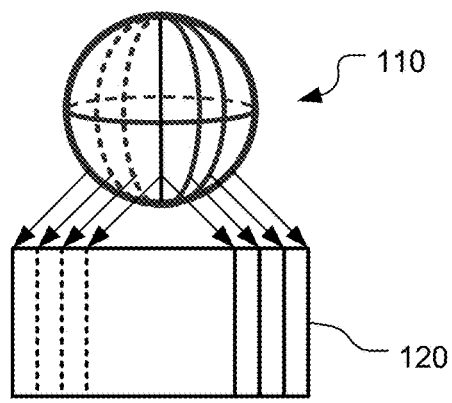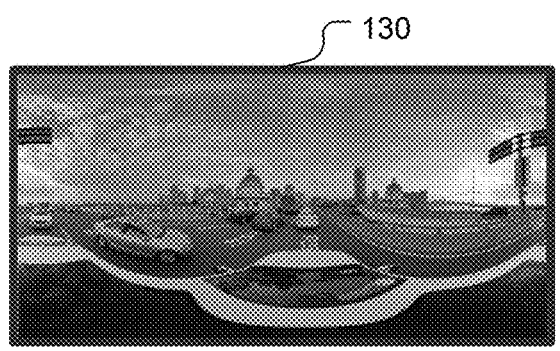
*Fig. 1A*  *Fig. 1B*
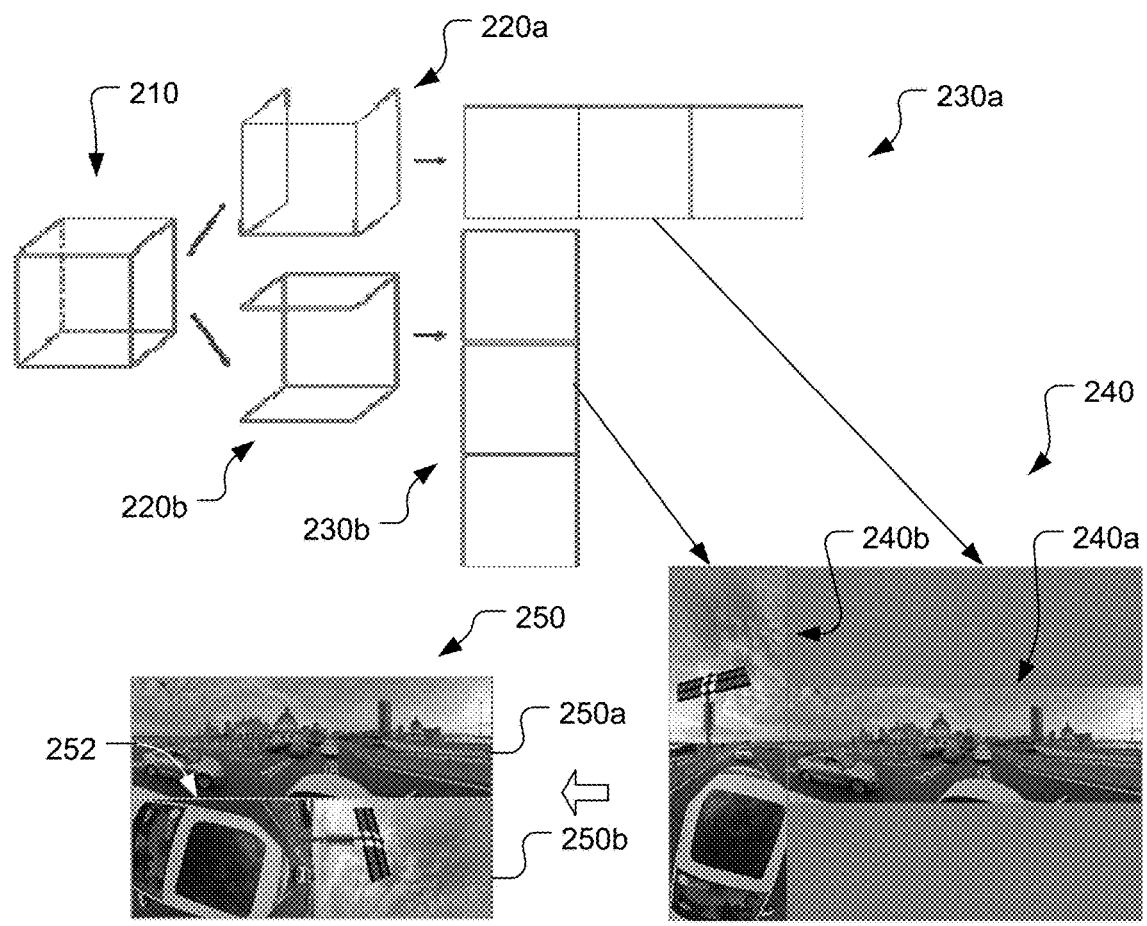
*Fig. 2*

METHOD AND APPARATUS FOR REDUCTION OF ARTIFACTS AT DISCONTINUOUS BOUNDARIES IN CODED VIRTUAL-REALITY IMAGES

CROSS REFERENCE TO RELATED APPLICATIONS

The present invention claims priority to U.S. Provisional Patent Application, Ser. No. 62/534,275, filed on Jul. 19, 2017. The U.S. Provisional Patent Application is hereby incorporated by reference in its entirety.

FIELD OF THE INVENTION

The present invention relates to image processing for 360-degree virtual reality (VR) images. In particular, the present invention relates to reducing artifacts at discontinuous boundaries in coded VR images by using post-processing filtering.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing of a scene using multiple cameras to cover a panoramic view, such as 360-degree field of view. The immersive camera usually uses a panoramic camera or a set of cameras arranged to capture 360-degree field of view. Typically, two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible.

The 360-degree virtual reality (VR) images may be captured using a 360-degree spherical panoramic camera or multiple images arranged to cover all field of views around 360 degrees. The three-dimensional (3D) spherical image is difficult to process or store using the conventional image/video processing devices. Therefore, the 360-degree VR images are often converted to a two-dimensional (2D) format using a 3D-to-2D projection method. For example, equirectangular projection (ERP) and cubemap projection (CMP) have been commonly used projection methods. Accordingly, a 360-degree image can be stored in an equirectangular projected format. The equirectangular projection maps the entire surface of a sphere onto a flat image. The vertical axis is latitude and the horizontal axis is longitude. FIG. 1A illustrates an example of projecting a sphere 110 into a rectangular image 120 according to equirectangular projection, where each longitude line is mapped to a vertical line of the ERP picture. FIG. 1B illustrates an example of ERP picture 130. For the ERP projection, the areas in the north and south poles of the sphere are stretched more severely (i.e., from a single point to a line) than areas near the equator. Furthermore, due to distortions introduced by the stretching, especially near the two poles, predictive coding tools often fail to make good prediction, causing reduction in coding efficiency. FIG. 2 illustrates a cube 210 with six faces, where a 360-degree virtual reality (VR) image can be projected to the six faces on the cube according to cubemap projection. There are various ways to lift the six faces off the cube and repack them into a rectangular picture. The example shown in FIG. 2 divides the six faces into two parts (220a and 220b), where each part consists of three connected faces. The two parts can be unfolded into two strips (230a and 230b), where each strip corresponds to a continuous picture. The two strips can be joined to form a rectangular picture 240 according to one CMP layout as shown in FIG. 2. However, the layout is not very efficient since some blank areas exist. Accordingly, a compact layout 250 is used, where a boundary 252 is indicated between the two strips (250a and 250b). However, the picture contents are continuous within each strip.

Besides the ERP and CMP formats, there are various other VR projection formats, such as octahedron projection (OHP), icosahedron projection (ISP), segmented sphere projection (SSP) and rotated sphere projection (RSP), that are widely used in the field.

FIG. 3A illustrates an example of octahedron projection (OHP), where a sphere is projected onto faces of an 8-face octahedron 310. The eight faces 320 lifted from the octahedron 310 can be converted to an intermediate format 330 by cutting open the face edge between faces 1 and 5 and rotating faces 1 and 5 to connect to faces 2 and 6 respectively, and applying a similar process to faces 3 and 7. The intermediate format can be packed into a rectangular picture 340. FIG. 3B illustrates an example of octahedron projection (OHP) picture 350, where discontinuous face edges 352 and 354 are indicated. As shown in layout format 340, discontinuous face edges 352 and 354 correspond to the shared face edge between face 1 and face 5 as shown in layout 320.

FIG. 4A illustrates an example of icosahedron projection (ISP), where a sphere is projected onto faces of a 20-face icosahedron 410. The twenty faces 420 from the icosahedron 410 can be packed into a rectangular picture 430 (referred as a projection layout), where the discontinuous face edges are indicated by thick dashed lines 432. An example of the converted rectangular picture 440 via the ISP is shown in FIG. 4B, where the discontinuous face boundaries are indicated by white dashed lines 442.

Segmented sphere projection (SSP) has been disclosed in JVET-E0025 (Zhang et al., "AHG8: Segmented Sphere Projection for 360-degree video", Joint Video Exploration Team (WET) of ITU-T SG 16 WP 3 and ISO/IEC JTC 1/SC 29/WG 11, 5th Meeting: Geneva, CH, 12-20 Jan. 2017, Document: WET-E0025) as a method to convert a spherical image into an SSP format. FIG. 5A illustrates an example of segmented sphere projection, where a spherical image 500 is mapped into a North Pole image 510, a South Pole image 520 and an equatorial segment image 530. The boundaries of 3 segments correspond to latitudes 45° N (502) and 45° S (504), where 0° corresponds to the equator (506). The North and South Poles are mapped into 2 circular areas (i.e., 510 and 520), and the projection of the equatorial segment can be the same as ERP or equal-area projection (EAP). The diameter of the circle is equal to the width of the equatorial segments because both Pole segments and equatorial segment have a 90° latitude span. The North Pole image 510, South Pole image 520 and the equatorial segment image 530 can be packed into a rectangular image 540 as shown in an example in FIG. 5B, where discontinuous boundaries 542, 544 and 546 between different segments are indicated.

FIG. 5C illustrates an example of rotated sphere projection (RSP), where the sphere 550 is partitioned into a middle 270°×90° region 552, and a residual part 554. These two parts of RSP can be further stretched on the top side and the bottom side to generate a deformed part 556 having oval-shaped boundaries 557 and 558 on the top part and bottom part as indicated by the dashed lines. FIG. 5D illustrates an example of RSP picture 560, where discontinuous boundaries 562 and 564 between two rotated segments are indicated by dashed lines.

Since the images or video associated with virtual reality may take a lot of space to store or a lot of bandwidth to transmit, therefore image/video compression is often used to reduce the required storage space or transmission bandwidth. However, when the three-dimensional (3D) virtual reality image is converted to a two-dimensional (2D) picture, some boundaries between faces may exist in the packed pictures via various projection methods. For example, a horizontal boundary 252 exists in the middle of the converted picture 250 according to the CMP in FIG. 2. Boundaries between faces also exist in converted pictures by other projection methods as shown in FIG. 3 through FIG. 5. As is known in the field, image/video coding usually results in some distortions between the original image/video and reconstructed image/video, which manifest visible artifacts in the reconstructed image/video.

FIG. 6A illustrates an example of artifacts in a reconstructed 3D picture on a sphere for the ERP. An original 3D sphere image 610 is projected to a 2D frame 620 for compression, which may introduce artifacts. The reconstructed 2D frame is projected back to a 3D sphere image 630. In this example, the picture contents are continuous from the left edge to the right edge. However, the video compression technique used usually disregards this fact. When the two edges are projected back to a 3D sphere image, the discontinuity at the seam corresponding to the two edges may become noticeable as indicated by the line with crosses 632. FIG. 6B illustrates an example of a visible artifact as indicated by arrows at a seam of discontinuous boundary. When this seam is projected to a 2D ERP frame, the artifact will be noticeable when the seam is projected a non-boundary part of the 2D ERP frame. For other projections, one or more discontinuous boundaries exist within the 2D frame.

Therefore, it is desirable to develop methods that can alleviate the visibility of artifacts at a seam of discontinuous boundary.

BRIEF SUMMARY OF THE INVENTION

Methods and apparatus of processing 360-degree virtual reality images are disclosed. According to one method, input data for a 2D (two-dimensional) frame are received, where the 2D frame is projected from a 3D (three-dimensional) sphere using a target projection. The 2D frame is divided into multiple blocks. The multiple blocks are encoded or decoded using quantization parameters by restricting a delta quantization parameter to be within a threshold for any two blocks corresponding to two neighboring blocks on a 3D sphere.

In one embodiment, the delta quantization parameter is restricted to ±x, where x is an integer greater than 0 and smaller than a maximum delta quantization for any two blocks in a whole frame of the 2D frame. The target projection may correspond to Equirectangular Projection (ERP). Cubemap Projection (CMP), Adjusted Cubemap Projection (ACP), Equal-Area Projection (EAP), Octahedron Projection (OHP), Icosahedron Projection (ISP), Segmented Sphere Projection (SSP), Rotated Sphere Projection (RSP), or Cylindrical Projection (CLP).

According to another method, input data for a 2D (two-dimensional) frame are received, where the 2D frame is projected from a 3D (three-dimensional) sphere using a target projection. One or more guard bands are added to one or more edges that are discontinuous in the 2D frame but continuous in the 3D sphere, where said one or more guard bands are filled with padding data. Applying A fade-out process is applied to said one or more guard bands to generate one or more faded guard bands. The 2D frame including the 2D frame are encoded or decoded with said one or more faded guard bands.

For this method, said one or more guard bands are filled using geometry padding, and wherein the geometry padding extends samples outside said one or edges of the 2D frame using neighboring samples on the 3D sphere. Said one or more guard bands may be filled by extending boundary samples of said one or more edges. Said one or more guard bands can be filled with duplicated samples from respective edge areas of said one or more edges. The fade-out process may be used to generate said one or more faded guard bands by blending said one or more guard bands with an overlapped region when the overlapped region exists and the fade-out process may be used to generate said one or more faded guard bands by blending said one or more guard bands with a predefined region when the overlapped region does not exist. The target projection may correspond to Equirectangular Projection (ERP) and Cubemap Projection (CMP), Adjusted Cubemap Projection (ACP), Equal-Area Projection (EAP), Octahedron Projection (OHP), Icosahedron Projection (ISP), Segmented Sphere Projection (SSP), Rotated Sphere Projection (RSP), or Cylindrical Projection (CLP).

A method of processing 360-degree virtual reality images for the decoder side is disclosed. Coded data for an extended 2D frame including a 2D (two-dimensional) frame with one or more faded guard bands are received, where the 2D frame is projected from a 3D (three-dimensional) sphere using a target projection. The coded data are decoded into a decoded extended 2D frame including a decoded 2D frame with one or more decoded faded guard bands. A reconstructed 2D frame is derived from the decoded extended 2D frame.

The reconstructed 2D frame may be generated from the decoded extended 2D frame by cropping said one or more decoded faded guard bands. The reconstructed 2D frame can be generated from the decoded extended 2D frame by blending said one or more decoded faded guard bands and reconstructed duplicated areas when one or more guard bands are filled with duplicated areas with samples from respective edge areas of one or more edges, and wherein one or more faded guard bands are generated by blending said one or more guard bands with the duplicated areas. The target projection may correspond to Equirectangular Projection (ERP) and Cubemap Projection (CMP), Adjusted Cubemap Projection (ACP), Equal-Area Projection (EAP), Octahedron Projection (OHP), Icosahedron Projection (ISP), Segmented Sphere Projection (SSP), Rotated Sphere Projection (RSP), or Cylindrical Projection (CLP).

BRIEF DESCRIPTION OF THE DRAWINGS

FIG. 1A illustrates an example of projecting a sphere into a rectangular image according to equirectangular projection, where each longitude line is mapped to a vertical line of the ERP picture.

FIG. 1B illustrates an example of ERP picture.

FIG. 2 illustrates a cube with six faces, where a 360-degree virtual reality (VR) image can be projected to the six faces on the cube according to cubemap projection.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 6A:
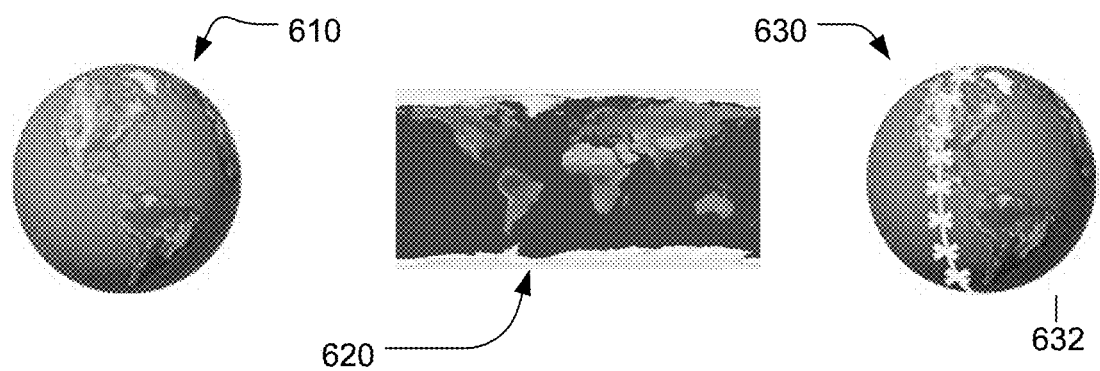
FIG. 6A illustrates an example of artifacts in a reconstructed 3D picture on a sphere for the ERP.
Figure 6B:
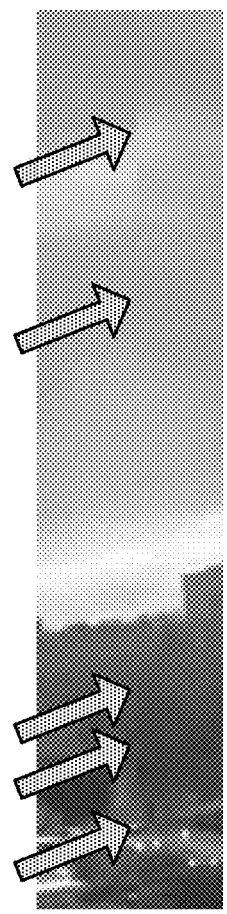
FIG. 6B illustrates an example of a visible artifact as indicated by arrows at a seam of discontinuous boundary.

As mentioned above, artifacts in a reconstructed projection picture may exist due to the discontinuous edges and the boundaries in a converted picture using various 3D-to-2D projection methods. In FIGS. 6A and 6B, an example of artifacts in a reconstructed picture for an ERP frame is illustrated.

Artifact Alleviation by Restricting Maximum Delta QP Between Neighboring Blocks in 3D As is known for video coding, the quantization parameter (QP) has been used as a parameter to adjust the bitrate. Larger quantization steps will result in a lower bitrate and cause larger distortion due to quantization errors. When two neighboring blocks have very different QPs, quality discrepancy will become more noticeable between the block boundaries and cause the seam to be more visible.

Figure 7:
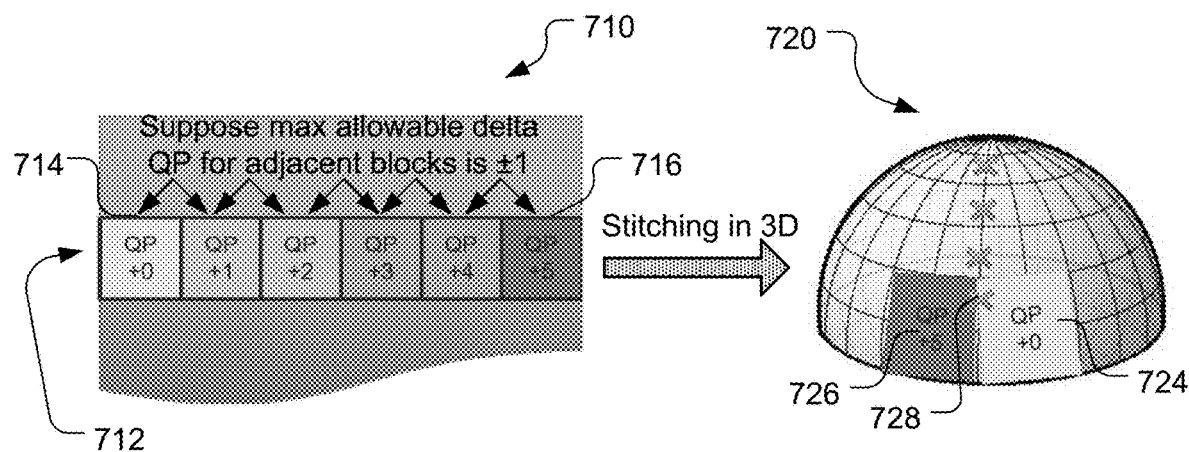
FIG. 7 illustrates an example that a conventional coding method may cause large QP difference between adjacent blocks in 3D pictures.

In order to alleviate the artifacts in the reconstructed VR image/video, a method of the present invention restricts the maximum allowable delta QP (i.e., the difference between two QPs) for adjacent blocks in a 2D frame to ensure the QP difference between adjacent blocks in 3D pictures to be within a limit. FIG. 7 illustrates an example that a conventional coding method may cause a large QP difference between adjacent blocks in 3D pictures. A row of coding units (CUs) 712 in a 2D frame 710 are being coded by a conventional coding method, which may adjust the QP by ±1 between any two adjacent blocks. Accordingly, it may occur that the QP increases sequentially from left to right with QP=0 for the first CU 714 and QP=+5 for the last CU 716. When the 2D frame is projected back to a 3D picture, the first CU 724 and the last CU 726 may become adjacent. The QP difference at block boundary 728 is 5. This large QP difference will cause the seam to be more noticeable.

Figure 8:
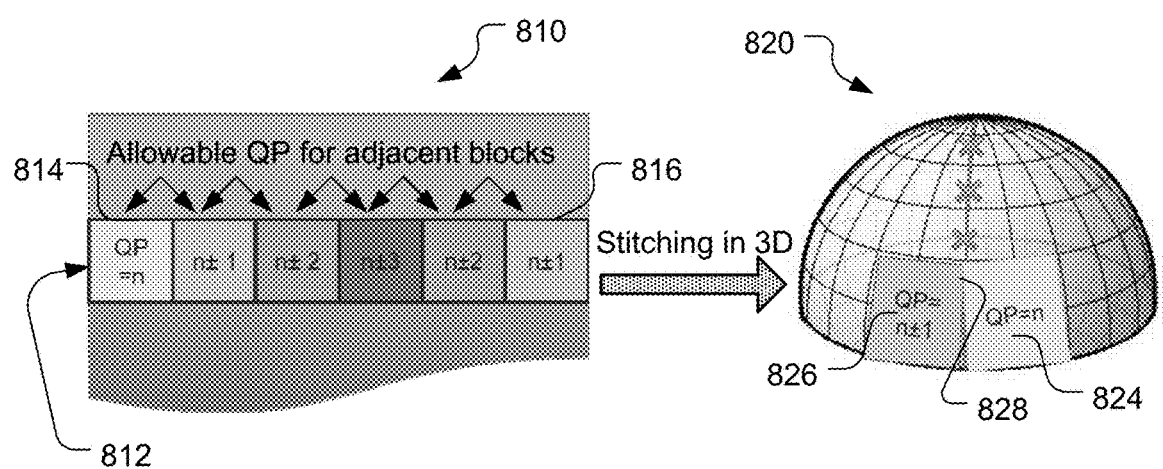
FIG. 8 illustrates an example that the maximum delta QP is restricted for adjacent blocks in a 3D picture.

According to the method of the present invention, the maximum allowable delta QP for adjacent blocks in 3D is restricted. For a block in a 360 immersive video, it always has some surrounding blocks. According to this method, maximum allowable delta QP is applied for all its surrounding blocks in 3D. This can reduce visual artifact caused by large delta QP at discontinuous boundary. FIG. 8 illustrates an example that the maximum delta QP is restricted for adjacent blocks in a 3D picture. A row of coding units (CUs) 812 in a 2D frame 810 are being coded by the coding method of the present invention, which may adjust the QP by ±1 between any two adjacent blocks in the 3D picture. Accordingly, for the first CU 814 and the last block 816 on the CU row 812, the maximum allowable delta QP is ±1 since they are adjacent in the 3D picture. When the 2D frame is projected back to a 3D picture, the first CU 824 and the last CU 826 are adjacent in the 3D picture. The QP difference at block boundary 828 is 1. Therefore, the seam becomes less noticeable.

Figure 9A:
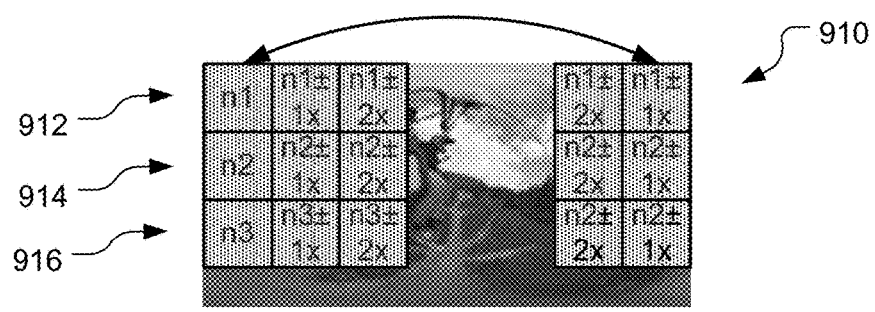
FIG. 9A illustrates an example of restricted maximum delta QP on adjacent blocks in a 3D picture for ERP.

FIGS. 9A to 9I illustrate examples of restricted maximum delta QP on adjacent blocks in a 3D picture for various projection formats. In these examples, the QP for a block as the discontinuous boundary is assumed to be $n_j$. The maximum allowable delta QP for adjacent blocks in a 3D picture is assumed to be ±1x, where x is an integer greater than 1. FIG. 9A illustrates an example of restricted maximum delta QP on adjacent blocks in a 3D picture for ERP. In FIG. 9A, the 2D frame 910 corresponds to an ERP frame. Three rows of CUs (i.e., 912, 914 and 916) are shown on the upper side of the 2D frame. The QPs for the CUs at the left boundary of the 2D frame are $n_1$, $n_2$ and $n_3$. As is known for an ERP frame, the block at the left edge of the 2D frame is adjacent to the block at the right edge of the 2D frame. Accordingly, the QP for the block at the right edge of the 2D frame is restricted to be ±1x of the block at the left edge of the 2D frame in the same row.

Figure 9B:
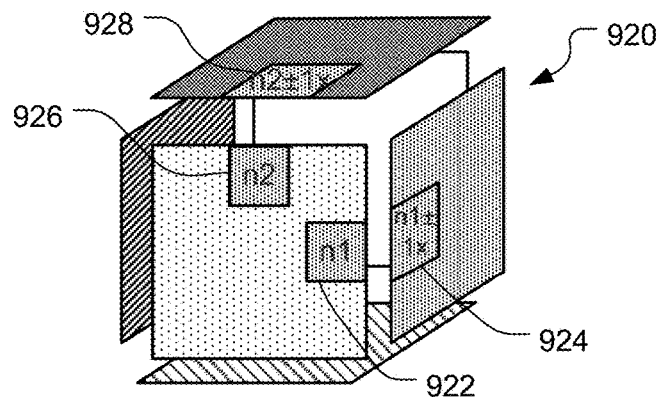
FIG. 9B illustrates an example of restricted maximum delta QP on adjacent blocks in a 3D picture for CMP.

FIG. 9B illustrates an example of restricted maximum delta QP on adjacent blocks in a 3D picture for CMP. In FIG. 9B, the cubemap faces 920 are shown. Block 922 at the edge of one face is adjacent to block 924 at the edge of another face. Block 926 at the edge of one face is adjacent to block 928 at the edge of another face. Accordingly, the QP for the adjacent blocks (i.e., blocks 922 and 924 or blocks 926 and 928) is restricted to be ±1x.

Figure 9C:
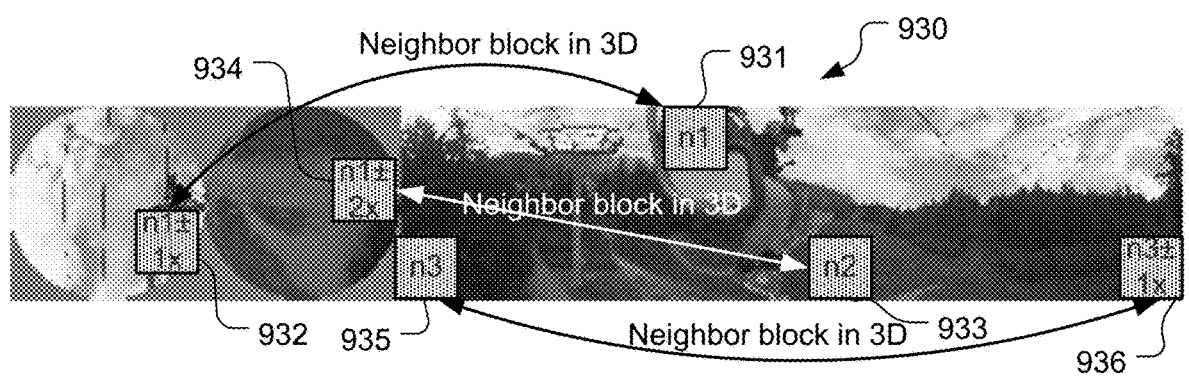
FIG. 9C illustrates an example of restricted maximum delta QP on adjacent blocks in a 3D picture for SSP.

FIG. 9C illustrates an example of restricted maximum delta QP on adjacent blocks in a 3D picture for SSP. In FIG. 9C, the 2D frame 930 corresponds to an SSP frame. Three pairs of adjacent blocks (i.e., 931-932, 933-934 and 935-936) are shown on the 2D frame. Accordingly, the QP for the adjacent blocks (i.e., blocks 931 and 932, blocks 933 and 934 or blocks 935 and 936) is restricted to be ±1x.

Figure 9D:
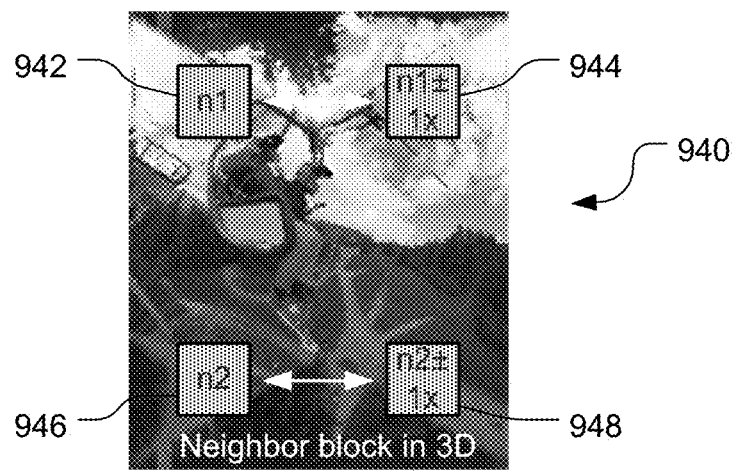
FIG. 9D illustrates an example of restricted maximum delta QP on adjacent blocks in a 3D picture for OHP.

FIG. 9D illustrates an example of restricted maximum delta QP on adjacent blocks in a 3D picture for OHP. In FIG. 9D, the 2D frame 940 corresponds to an OHP frame. Two pairs of adjacent blocks (i.e., 942-944 and 946-948) are shown on the 2D frame. Accordingly, the QP for the adjacent blocks (i.e., blocks 942 and 944, or blocks 946 and 948) is restricted to be ±1x.

Figure 9E:
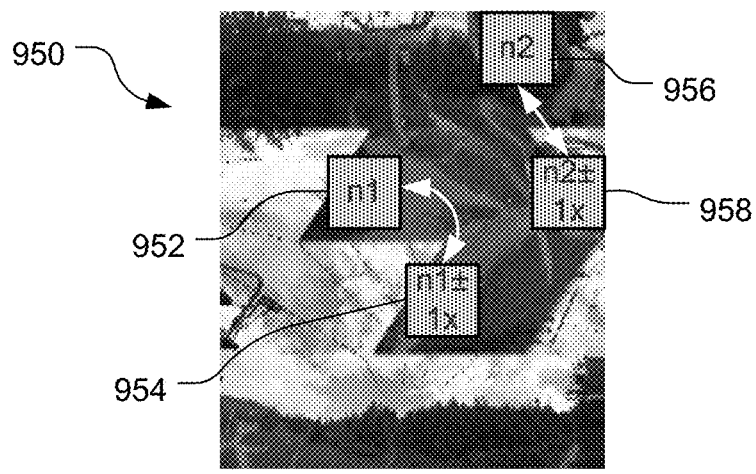
FIG. 9E illustrates an example of restricted maximum delta QP on adjacent blocks in a 3D picture for ISP.

FIG. 9E illustrates an example of restricted maximum delta QP on adjacent blocks in a 3D picture for ISP. In FIG. 9E, the 2D frame 950 corresponds to an ISP frame. Two pairs of adjacent blocks (i.e., 952-954 and 956-958) are shown on the 2D frame. Accordingly, the QP for the adjacent blocks (i.e., blocks 952 and 954, or blocks 956 and 958) is restricted to be ±1x.

Figure 9F:
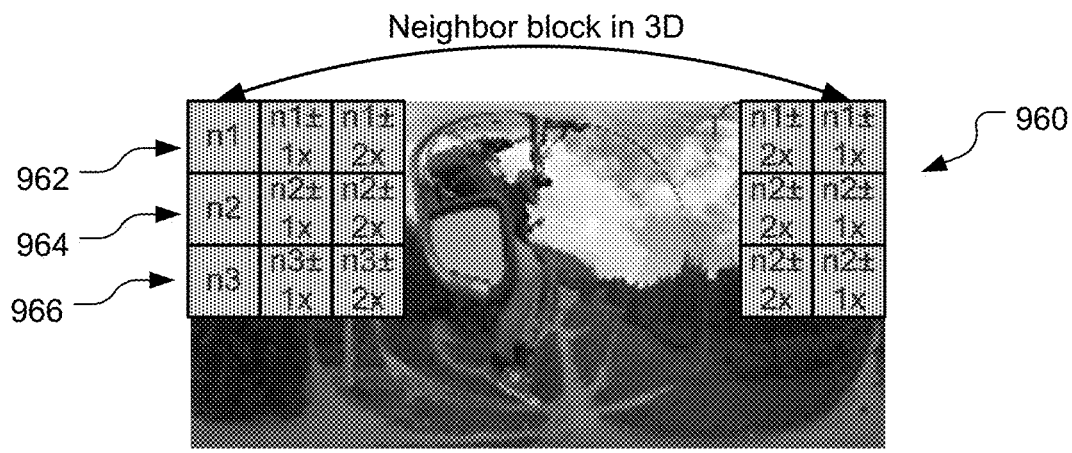
FIG. 9F illustrates an example of restricted maximum delta QP on adjacent blocks in a 3D picture for equal-area projection (EAP).

FIG. 9F illustrates an example of restricted maximum delta QP on adjacent blocks in a 3D picture for equal-area projection (EAP). In FIG. 9F, the 2D frame 960 corresponds to an EAP frame. Three rows of CUs (i.e., 962, 964 and 966) are shown on the upper side of the 2D frame. The QPs for the CUs at the left boundary of the 2D frame are $n_1$, $n_2$ and $n_3$. As is known for an ERP frame, the block at the left edge of the 2D frame is adjacent to the block at the right edge of the 2D frame. Accordingly, the QP for the block at the right edge of the 2D frame is restricted to be ±1x of the block at the left edge of the 2D frame in the same row.

Figure 9G:
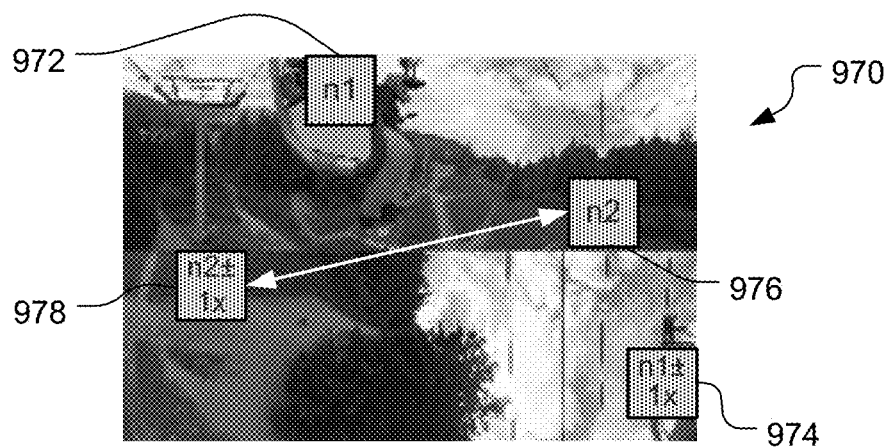
FIG. 9G illustrates an example of restricted maximum delta QP on adjacent blocks in a 3D picture for ACP.

FIG. 9G illustrates an example of restricted maximum delta QP on adjacent blocks in a 3D picture for ACP. In FIG. 9G, the 2D frame 970 corresponds to an ACP frame. Two pairs of adjacent blocks (i.e., 972-974 and 976-978) are shown on the 2D frame. Accordingly, the QP for the adjacent blocks (i.e., blocks 972 and 974, or blocks 976 and 978) is restricted to be ±1x.

Figure 9H:
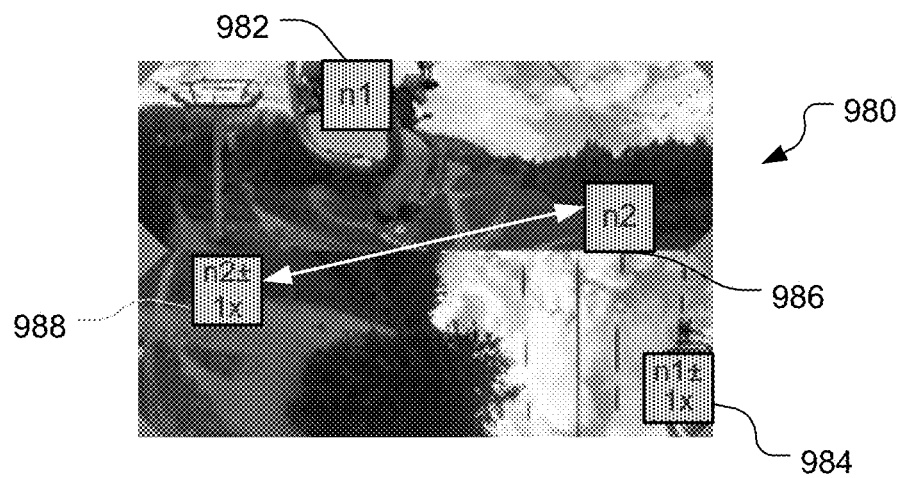
FIG. 9H illustrates an example of restricted maximum delta QP on adjacent blocks in a 3D picture for RSP.

FIG. 9H illustrates an example of restricted maximum delta QP on adjacent blocks in a 3D picture for RSP. In FIG. 9H, the 2D frame 980 corresponds to an RSP frame. Two pairs of adjacent blocks (i.e., 982-984 and 986-988) are shown on the 2D frame. Accordingly, the QP for the adjacent blocks (i.e., blocks 982 and 984, or blocks 986 and 988) is restricted to be ±1x.

Figure 9I:
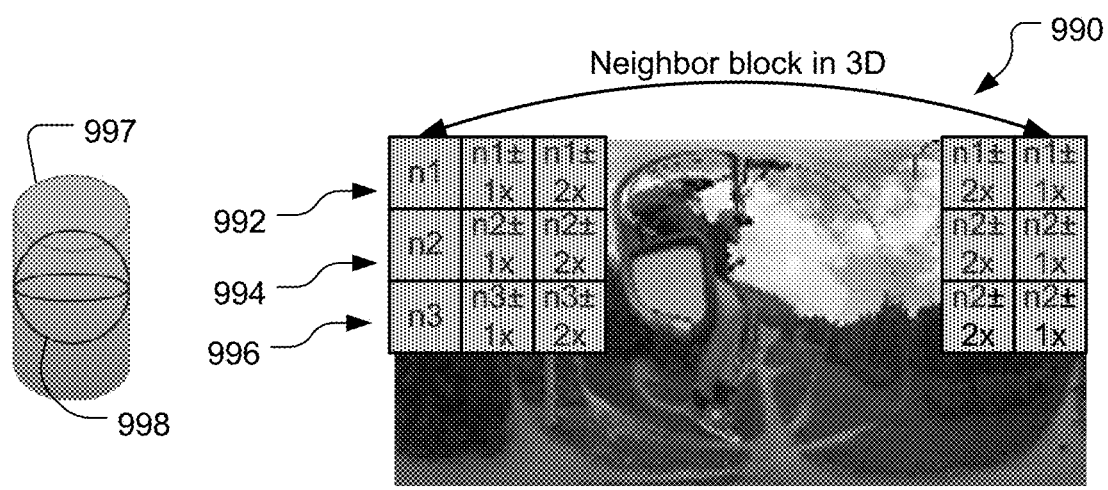
FIG. 9I illustrates an example of restricted maximum delta QP on adjacent blocks in a 3D picture for Cylindrical Projection.

Besides these projections mentioned above, cylindrical projection has also been used to project a 3D sphere into a 2D frame. Conceptually, cylindrical projections are created by wrapping a cylinder 997 around a globe 998 and projecting light through the globe onto the cylinder as shown in FIG. 9I. Cylindrical projections represent meridians as straight, evenly-spaced, vertical lines and parallels as straight horizontal lines. Meridians and parallels intersect at right angles, as they do on the globe. Depending on the placement of the light source, various CLPs are generated. FIG. 9I illustrates an example of restricted maximum delta QP on adjacent blocks in a 3D picture for Cylindrical Projection. In FIG. 9I, the 2D frame 990 corresponds to a Cylindrical Projection frame. Three rows of CUs (i.e., 992, 994 and 996) are shown on the top side of the 2D frame. The QPs for the CUs at the left boundary of the 2D frame are $n_1$, $n_2$ and $n_3$. As is known for an ERP frame, the block at the left edge of the 2D frame is adjacent to the block at the right edge of the 2D frame. Accordingly, the QP for the block at the right edge of the 2D frame is restricted to be ±1x of the block at the left edge of the 2D frame in the same row.

Artifact Alleviation by Applying a Guard Band

In FIGS. 6A and 6B, an example of artifacts in a reconstructed 3D picture on a sphere for the ERP is described. In this case, the picture contents are continuous from the left edge to the right edge. However, the video compression technique used usually disregards this fact. When the two edges are projected back to a 3D sphere image, the discontinuity at the seam corresponding to the two edges may become noticeable. For other projection formats, the 2D frame may contain one or more discontinuous boundaries. Discontinuous boundaries for various projection formats have been illustrates in FIGS. 2, 3B, 4B, 5B, and 5D. When video compression is applied, coding artifacts may be more noticeable at discontinuous boundaries.

In order to alleviate the artifacts at discontinuous boundaries, a method to apply guard band on the edges that are discontinuous on 2D frame but continuous in 3D is disclosed. According to this method, guard band areas are filled up by "geometry padding" or other padding methods. The content in the guard band is then faded out before compression is applied. After compression, the 2D frame is projected back (i.e., stitched) to a 3D picture. During the 2D-to-3D projection (i.e., stitching process), the guard band can be cropped or the overlapping guard bands can be blended into an original frame. Geometry padding is a known technique for 3D video processing, where the geometry projection format is considered when performing padding. In particular, the corresponding sample outside of a face's boundary (which may come from another side in the same face or from another face), is derived with rectilinear projection.

Figure 10:
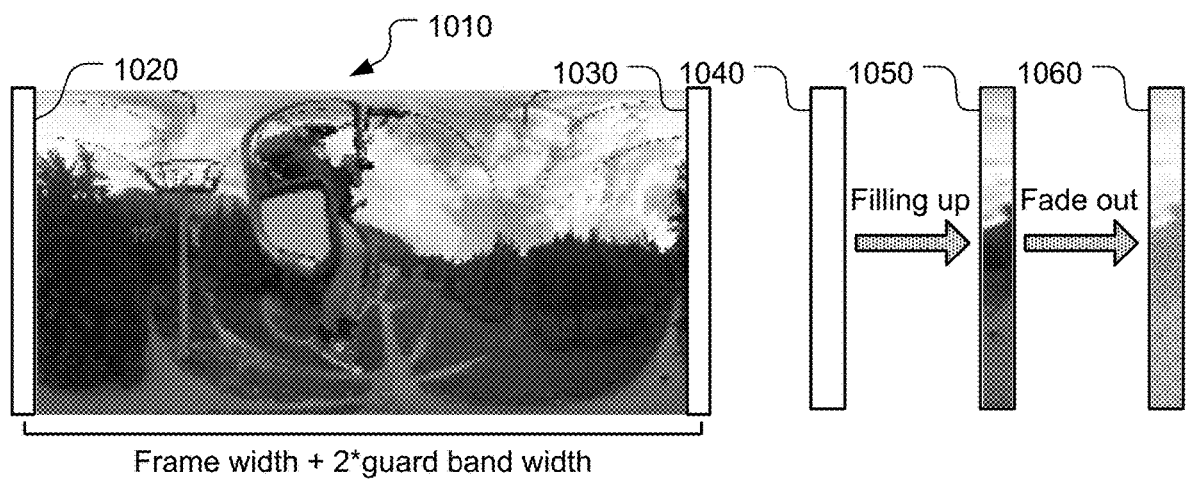
FIG. 10 illustrates an example of applying guard band for ERP.

FIG. 10 illustrates an example of applying guard band for ERP. For the ERP frame 1010, guard bands (i.e., 1020 and 1030) are added to the left edge and right edge. The guard band 1040 is then filled with pixel values to become a filled guard band 1050. For example, the pixel values may correspond to adjacent image values. The filled guard band 1050 is then faded to form a faded guard band 1060. In the case of ERP frame, the guard band is extended from the ERP frame into a non-existing area, the fading process will blend the filled guard band with the assumed values of the non-existing area. For example, the non-existing area may be all white (i.e., the highest intensity). The blending process may use weighted sum to generate the faded guard band by assigning different weights to the filled guard band and the non-existing area.

Figure 11:
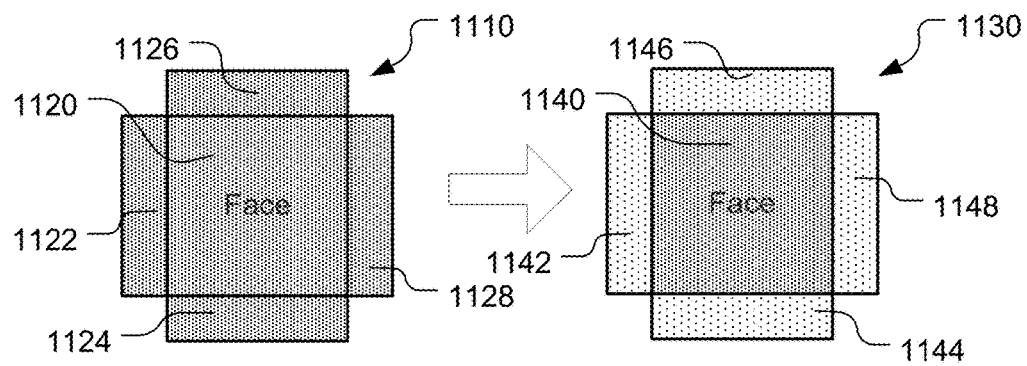
FIG. 11 illustrates an example of applying guard band for CMP.

FIG. 11 illustrates an example of applying guard band for CMP. For a CMP face 1110, guard bands 1122-1128 are added to four edges of face 1120 to form a padded face 1110. The guard bands 1122-1128 can be filled with pixel values of adjacent image. The filled guard bands 1122-1128 are then faded to form faded guard bands 1142-1148 around face 1140 to form a padded-faded face 1130. For the fading process, the filled guard bands may be blended with predefined regions such as white regions or gray regions.

Figure 12A:
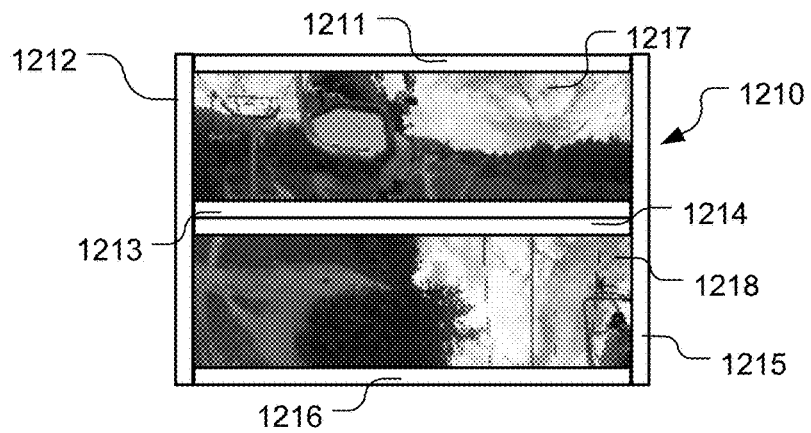
FIG. 12A illustrates an example of applying guard band for a CMP frame.

FIG. 12A illustrates an example of applying guard band for a CMP frame according to the layout format 250 in FIG. 2. For the CMP frame 1210, guard bands 1211-1216 are added to edges of two strips (1217, 1218) of the CMP frame 1210. As mentioned before, the guard bands 1211-1216 can be filled with pixel values of adjacent image and then faded to form faded guard bands.

Figure 5A:
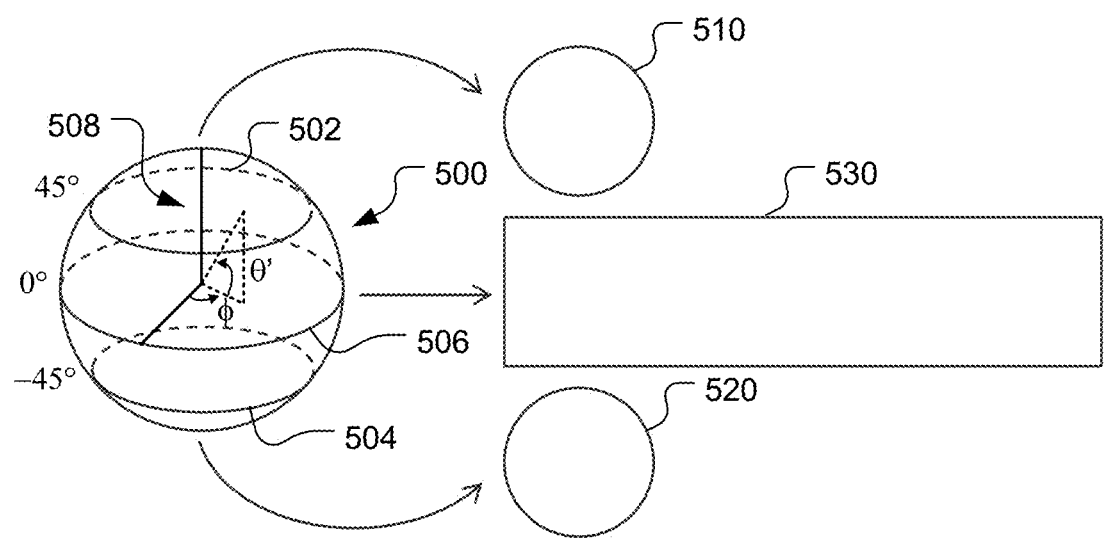
FIG. 5A illustrates an example of segmented sphere projection (SSP), where a spherical image is mapped into a North Pole image, a South Pole image and an equatorial segment image.
Figure 5B:
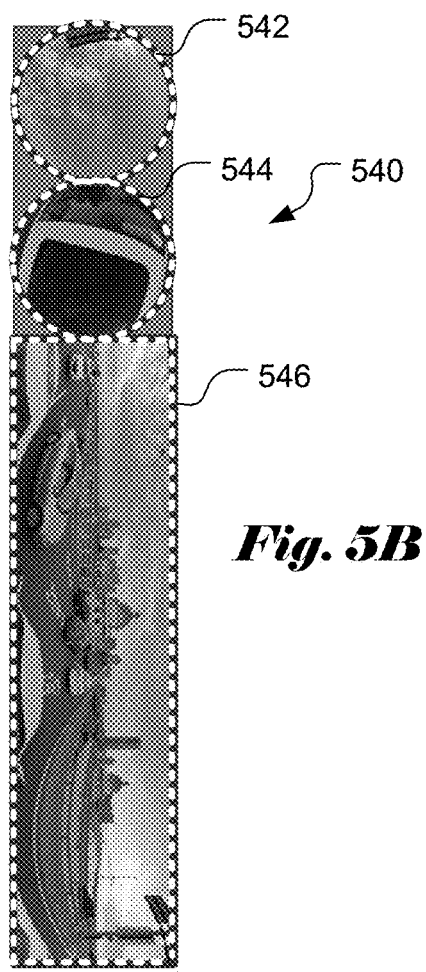
FIG. 5B illustrates an example of segmented sphere projection (SSP) picture, where discontinuous boundaries between different segments are indicated.
Figure 5C:
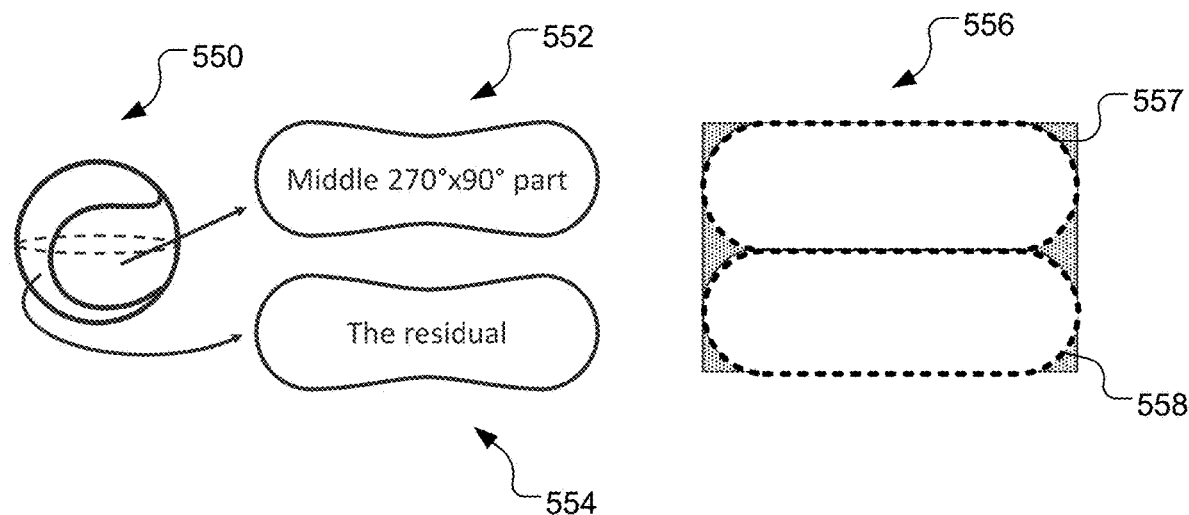
FIG. 5C illustrates an example of rotated sphere projection (RSP), where the sphere is partitioned into a middle 270°×90° region and a residual part. These two parts of RSP can be further stretched on the top side and the bottom side to generate deformed parts having oval-shaped boundary on the top part and bottom part.
Figure 5D:
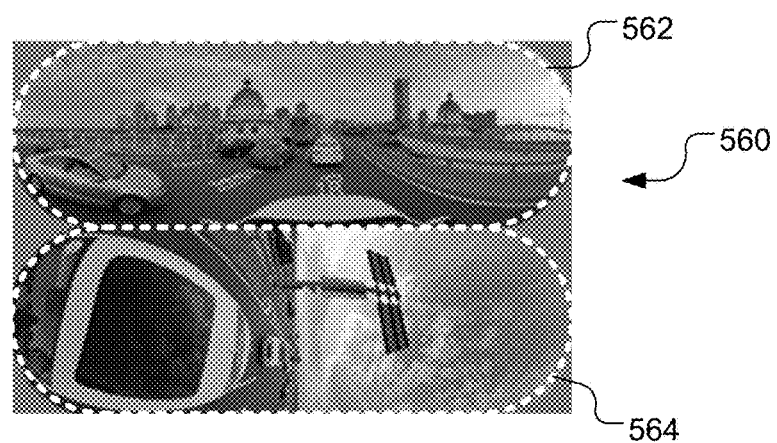
FIG. 5D illustrates an example of rotated sphere projection (RSP) picture, where discontinuous boundaries between different segments are indicated.
Figure 12B:
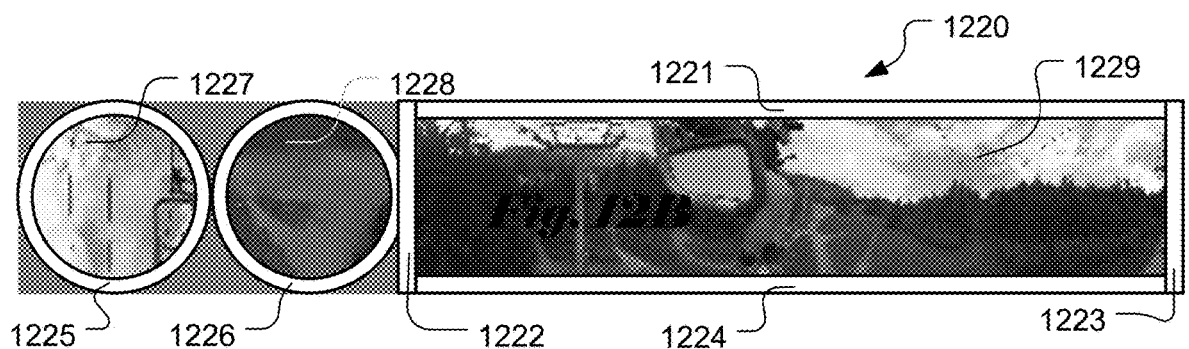
FIG. 12B illustrates an example of applying guard band for an SSP frame.

FIG. 12B illustrates an example of applying guard band for an SSP frame according to a rotated layout format 540 in FIG. 5B. For the SSP frame 1220, guard bands 1221-1226 are added to edges of two poles (1227, 1228) and the main part 1229 of the SSP frame 1220. As mentioned before, the guard bands 1211-1216 can be filled with pixel values of adjacent image and then faded to form faded guard bands.

Figure 3A:
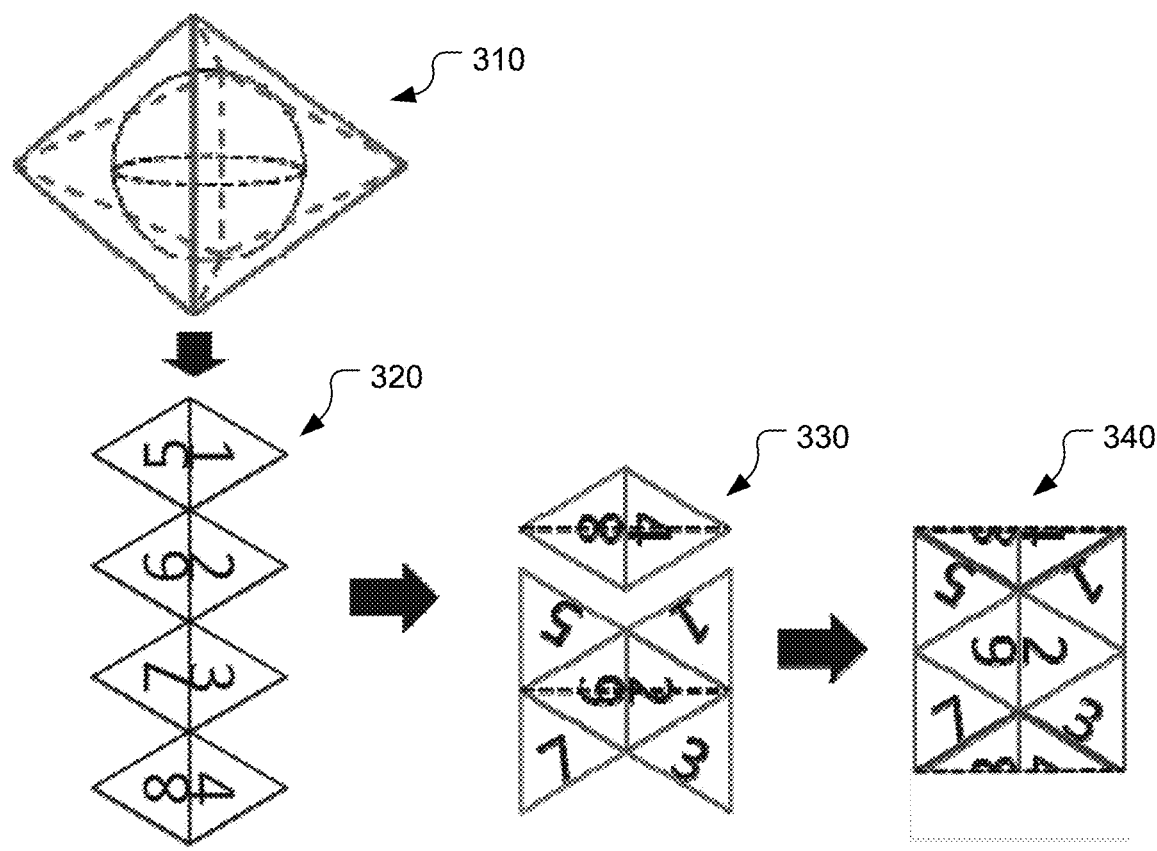
FIG. 3A illustrates an example of octahedron projection (OHP), where a sphere is projected onto faces of an 8-face octahedron.
Figure 3B:
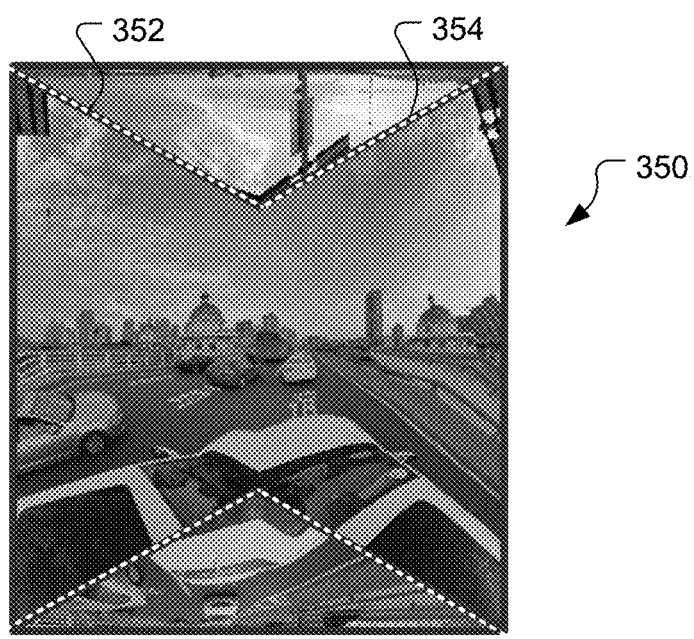
FIG. 3B illustrates an example of octahedron projection (OHP) picture, where discontinuous face edges are indicated.
Figure 12C:
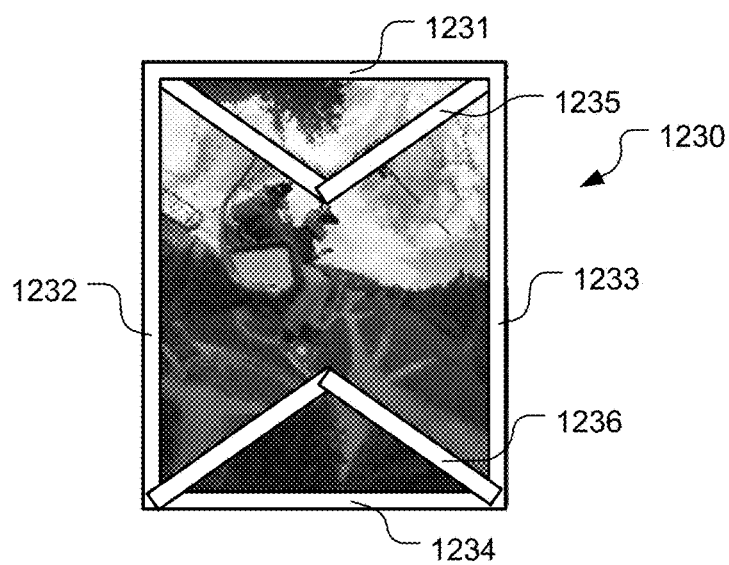
FIG. 12C illustrates an example of applying guard band for an OHP frame.

FIG. 12C illustrates an example of applying guard band for an OHP frame according to the layout format 350 in FIG. 3B. For the OHP frame 1230, guard bands 1231-1236 are added to edges of parts of the CMP frame 1230. As mentioned before, the guard bands 1231-1236 can be filled with pixel values of adjacent image and then faded to form faded guard bands.

Figure 12D:
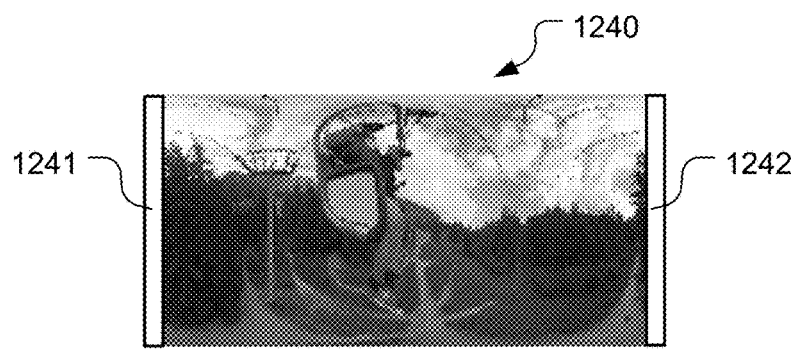
FIG. 12D illustrates an example of applying guard band for an EAP frame.

FIG. 12D illustrates an example of applying guard band for an EAP frame. For the EAP frame 1240, guard bands 1241-1242 are added to left and right edges of the EAP frame 1240. As mentioned before, the guard bands 1241-1242 can be filled with pixel values of adjacent image and then faded to form faded guard bands.

Figure 4A:
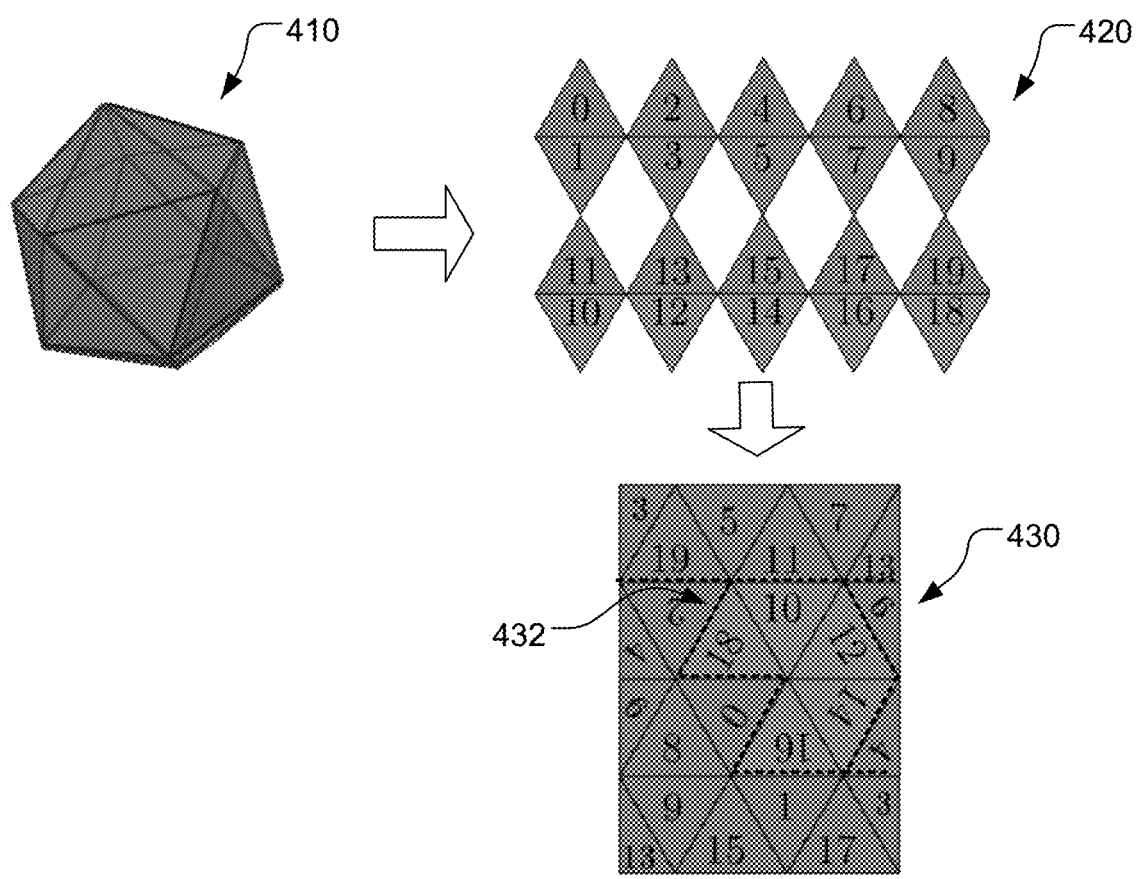
FIG. 4A illustrates an example of icosahedron projection (ISP), where a sphere is projected onto faces of a 20-face icosahedron.
Figure 4B:
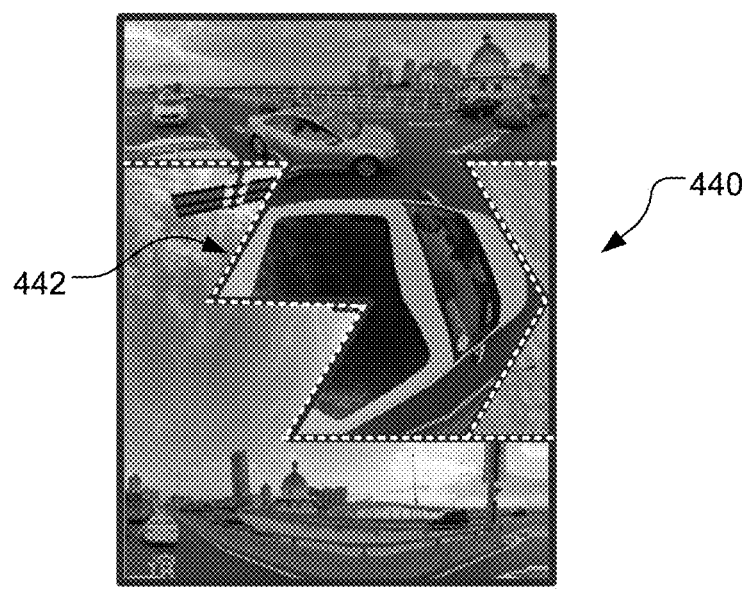
FIG. 4B illustrates an example of icosahedron projection (ISP) picture, where the discontinuous face boundaries are indicated by white dashed lines 442.
Figure 12E:
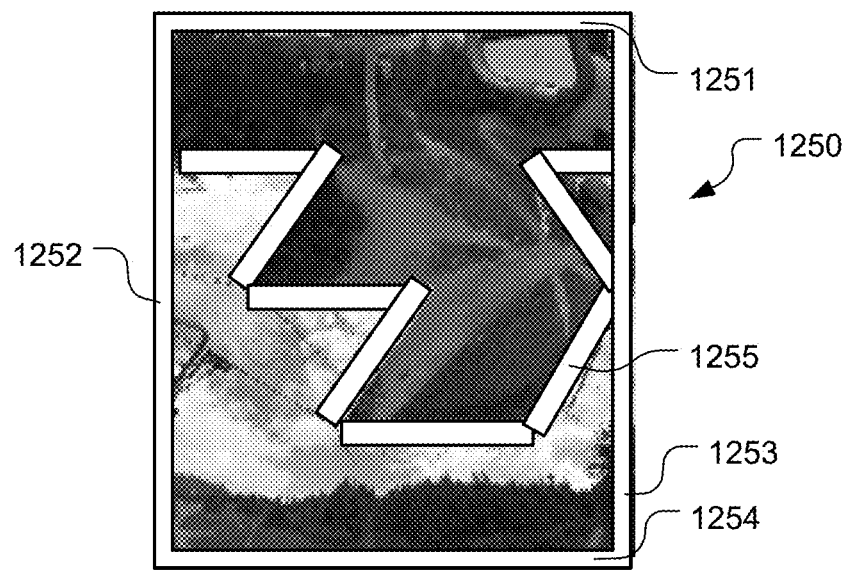
FIG. 12E illustrates an example of applying guard band for an ISP frame.

FIG. 12E illustrates an example of applying guard band for an ISP frame according to the layout format 440 in FIG. 4B. For the ISP frame 1250, guard bands 1251-1255 are added to edges of parts of the ISP frame 1250. As mentioned before, the guard bands 1251-1255 can be filled with pixel values of adjacent image and then faded to form faded guard bands.

Figure 12F:
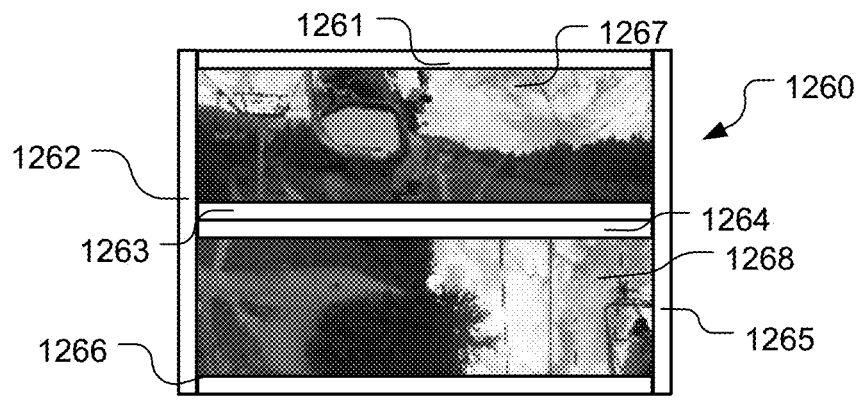
FIG. 12F illustrates an example of applying guard band for an ACP.

FIG. 12F illustrates an example of applying guard band for an ACP frame 1260. For the CMP frame 1260, guard bands 1261-1266 are added to edges of two strips (1267, 1268) of the ACP frame 1260. As mentioned before, the guard bands 1261-1266 can be filled with pixel values of adjacent image and then faded to form faded guard bands.

Figure 12G:
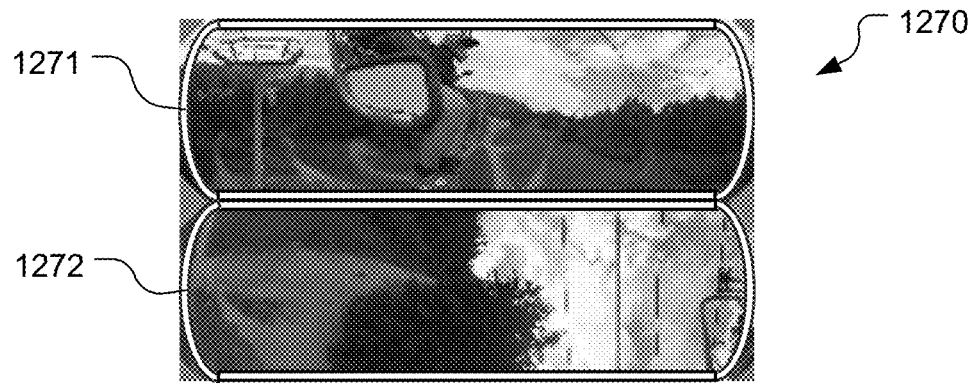
FIG. 12G illustrates an example of applying guard band for an RSP.

FIG. 12G illustrates an example of applying guard band for an RSP frame 1270. For the RSP frame 1270, guard bands 1271-1272 are added to edges of two parts of the RSP frame 1270. As mentioned before, the guard bands 1271-1272 can be filled with pixel values of adjacent image and then faded to form faded guard bands.

Figure 12H:
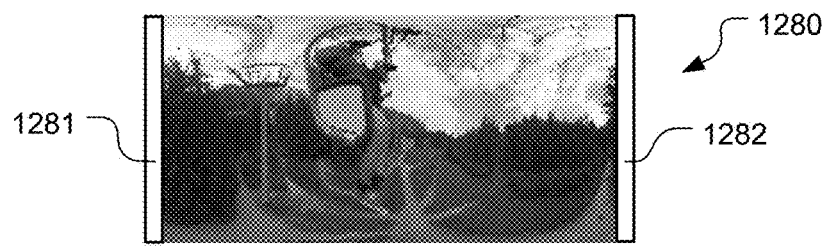
FIG. 12H illustrates an example of applying guard band for a Cylindrical Projection frame. For the Cylindrical Projection frame 1280, guard bands 1281-1282 are added to left and right.

FIG. 12H illustrates an example of applying guard band for a Cylindrical Projection frame. For the Cylindrical Projection frame 1280, guard bands 1281-1282 are added to left and right edges of the Cylindrical Projection frame 1280. As mentioned before, the guard bands 1281-1282 can be filled with pixel values of adjacent image and then faded to form faded guard bands.

Figure 13:
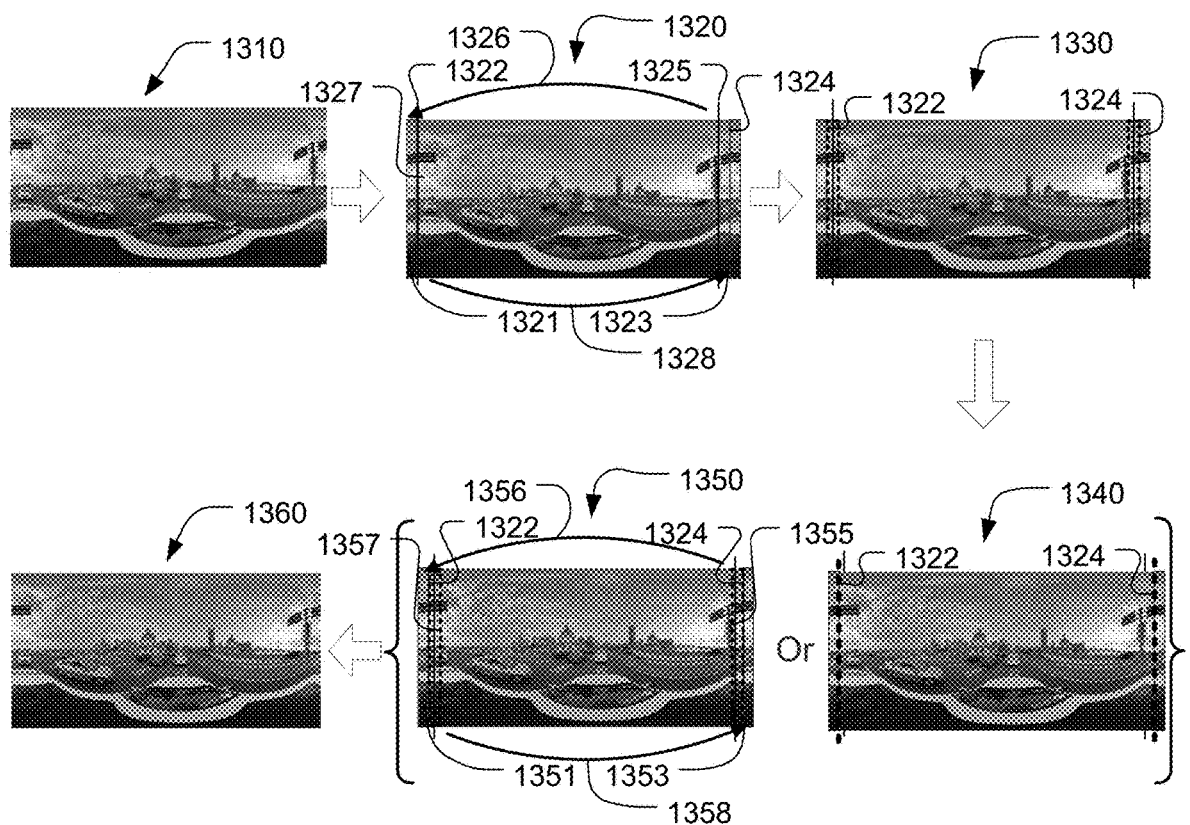
FIG. 13 illustrates an example of processing flow of a video coding system using guard bands for a 2D frame converted from a 3D projection.

FIG. 13 illustrates an example of processing flow of a video coding system using guard bands for a 2D frame converted from a 3D projection. The input image 1310 corresponds to an ERP frame. Guard bands (1321, 1323) are added to the left edge 1322 and the right edge 1324 of the 2D frame to form a padded frame 1320. Since the image contents of the ERP frame is continuous from the left edge to the right edge, the guard band 1321 on the left side can be duplicated from the image area 1325 on the right edge as indicated by arrow 1326 in one embodiment. Similarly, the guard band 1323 on the right side can be duplicated from the image area 1327 on the left edge as indicated by arrow 1328. The padded frame 1320 is then coded into frame 1330, where the original image edges 1322 and 1324 are indicated. In order to reconstruct the ERP frame, the guard bands outside the image edges 1322 and 1324 can be cropped as shown for frame 1340 or the duplicated areas can be blended as shown for frame 1350. For the blending process, guard band 1351 on the left corresponds to duplicated area 1355 on the right. Therefore, guard band 1351 is blended with duplicated area 1355 as indicated by arrow 1356. Similarly, guard band 1353 is blended with duplicated area 1357 as indicated by arrow 1358. After blending, the guard bands are not needed and can be removed to form the final reconstructed frame 1360.

Figure 14:
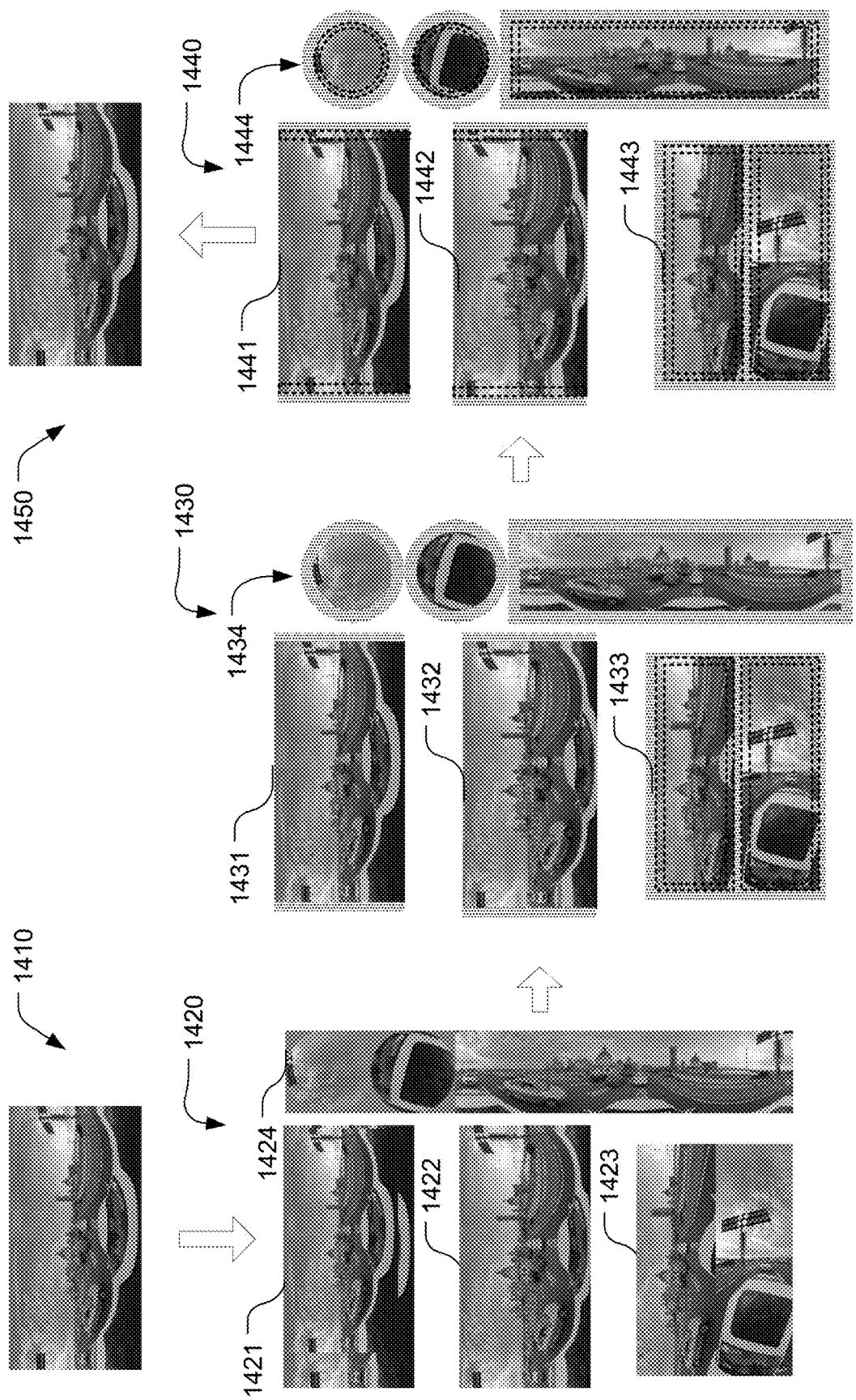
FIG. 14 illustrates an example of processing flow of a video coding system using guard bands for a 2D frame converted from a 3D projection.

FIG. 14 illustrates an example of processing flow of a video coding system using guard bands for a 2D frame converted from a 3D projection. The input image 1410 corresponds to an ERP frame. The ERP frame can be further converted to other 2D frame format such as ERP 1421, EAP 1422, CMP 1423 and SSP 1424. The formula to convert from the ERP format to other projection format is known in the art. In the case that the ERP is converted to ERP format, the conversion corresponds to an identity conversion. Guard bands are added to respective 2D formats to form padded ERP 1431, padded EAP 1432, padded CMP 1433 and padded SSP 1434 by duplicating samples from neighboring image area in the 3D space. Video coding is then applied to padded frames to generate respective coded ERP 1441, EAP 1442, CMP 1443 and SSP 1444. The duplicated samples can be cropped, blended or filtered when converting back to the ERP format 1450.

Figure 15:
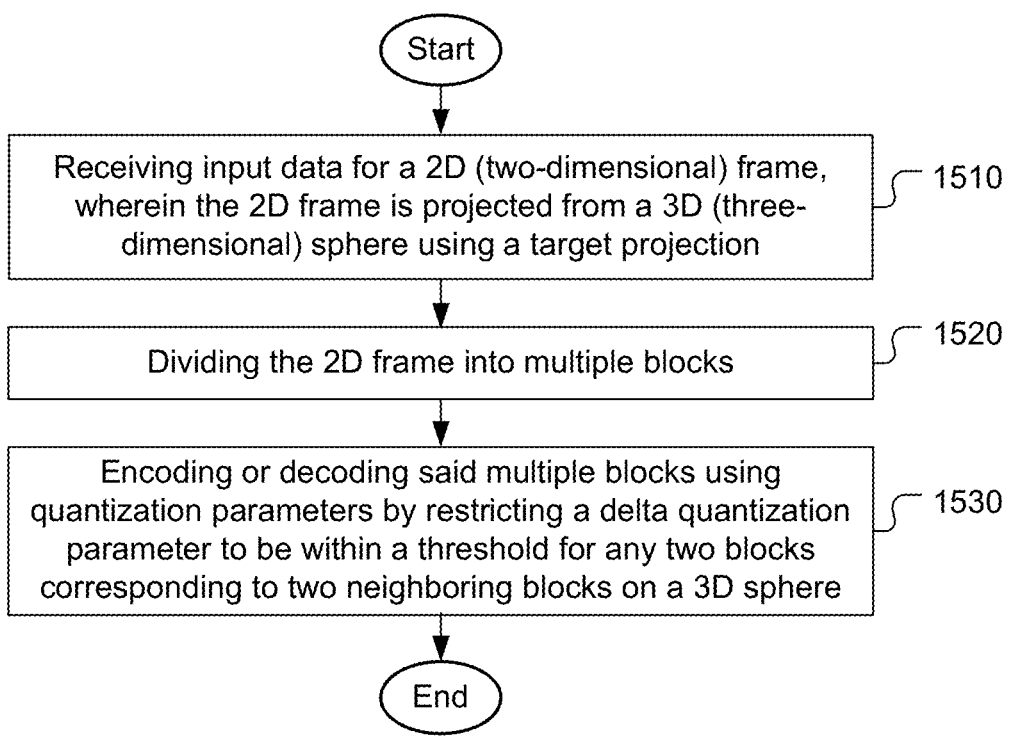
FIG. 15 illustrated an exemplary flowchart of a method incorporating the restricted delta quantization parameter (QP) to alleviate the artifacts due to the discontinuous edges in a converted picture.

An exemplary flowchart of a method incorporating the restricted delta quantization parameter (QP) to alleviate the artifacts due to the discontinuous edges in a converted picture is illustrated in FIG. 15. The steps shown in the flowchart may be implemented as program codes executable on one or more processors (e.g., one or more CPUs) at the encoder side. The steps shown in the flowchart may also be implemented based on hardware such as one or more electronic devices or processors arranged to perform the steps in the flowchart. According to this method, input data for a 2D (two-dimensional) frame are received in step 1510, where the 2D frame is projected from a 3D (three-dimensional) sphere using a target projection. The 2D frame is divided into multiple blocks in step 1520. Said multiple blocks are encoded or decoded using quantization parameters by restricting a delta quantization parameter to be within a threshold for any two blocks corresponding to two neighboring blocks on a 3D sphere in step 1530.

Figure 16:
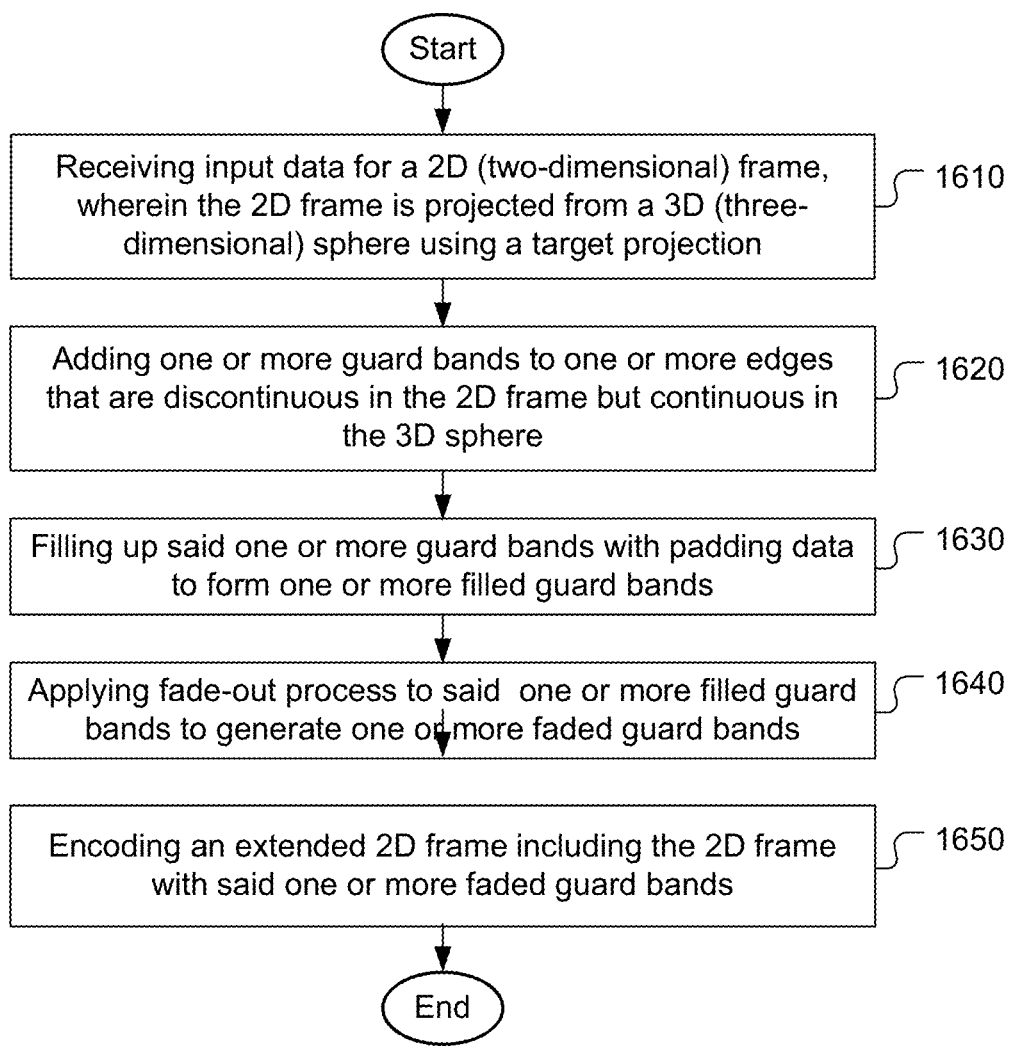
FIG. 16 illustrates another exemplary flowchart of an encoder system that adds one or more guard bands to one or more edges that are discontinuous in the 2D frame but continuous in the 3D sphere.

FIG. 16 illustrates another exemplary flowchart of an encoder system that adds one or more guard bands to one or more edges that are discontinuous in the 2D frame but continuous in the 3D sphere. According to this method, input data for a 2D (two-dimensional) frame are received in step 1610, wherein the 2D frame is projected from a 3D (three-dimensional) sphere using a target projection. One or more guard bands are added to one or more edges that are discontinuous in the 2D frame but continuous in the 3D sphere in step 1620. Said one or more guard bands are filled with padding data to form one or more filled guard bands in step 1630. Fade-out process is applied to said one or more filled guard bands to generate one or more faded guard bands in step 1640. An extended 2D frame including the 2D frame with said one or more faded guard bands is encoded in step 1650.

Figure 17:
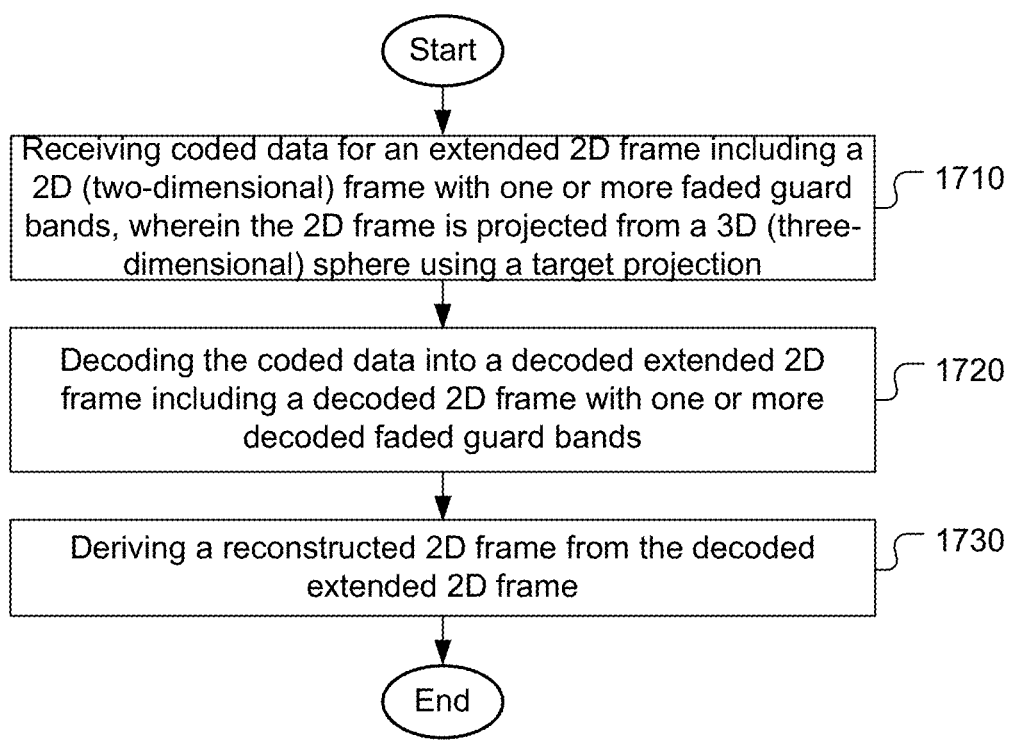
FIG. 17 illustrates another exemplary flowchart of a decoder system that reconstructs images that adds one or more guard bands to one or more edges that are discontinuous in the 2D frame but continuous in the 3D sphere.

FIG. 17 illustrates another exemplary flowchart of a decoder system that reconstructs images that adds one or more guard bands to one or more edges that are discontinuous in the 2D frame but continuous in the 3D sphere. According to this method, coded data for an extended 2D frame including a 2D (two-dimensional) frame with one or more faded guard bands are received in step 1710, wherein the 2D frame is projected from a 3D (three-dimensional) sphere using a target projection. The coded data are decoded into a decoded extended 2D frame including a decoded 2D frame with one or more decoded faded guard bands in step 1720. A reconstructed 2D frame is derived from the decoded extended 2D frame in step 1730.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing 360-degree virtual reality images, the method comprising:
receiving input data for a 2D (two-dimensional) frame, wherein the 2D frame is projected from a 3D (three-dimensional) sphere using a target projection;
dividing the 2D frame into multiple blocks; and
encoding or decoding said multiple blocks using quantization parameters by restricting a delta quantization parameter to be within a threshold for any two blocks corresponding to two neighboring blocks on the 3D sphere, wherein the delta quantization parameter is restricted to (+/−)x, and wherein x is an integer greater than 0 and smaller than a maximum delta quantization parameter for any two blocks in a whole frame of the 2D frame.

2. The method of claim 1, wherein the target projection corresponds to Equirectangular Projection (ERP), Cubemap Projection (CMP), Adjusted Cubemap Projection (ACP), Equal-Area Projection (EAP), Octahedron Projection (OHP), Icosahedron Projection (ISP), Segmented Sphere Projection (SSP), Rotated Sphere Projection (RSP), or Cylindrical Projection (CLP).

3. An apparatus for processing 360-degree virtual reality images, the apparatus comprising one or more electronic devices or processors configured to:
receive input data for a 2D (two-dimensional) frame, wherein the 2D frame is projected from a 3D (three-dimensional) sphere using a target projection;
divide the 2D frame into multiple blocks; and
encode or decode said multiple blocks using quantization parameters by restricting a delta quantization parameter to be within a threshold for any two blocks corresponding to two neighboring blocks on the 3D sphere, wherein the delta quantization parameter is restricted to (+/−)x, and wherein x is an integer greater than 0 and smaller than a maximum delta quantization parameter for any two blocks in a whole frame of the 2D frame.

4. A method of processing 360-degree virtual reality images, the method comprising:
- receiving input data for a 2D (two-dimensional) frame, wherein the 2D frame is projected from a 3D (three-dimensional) sphere using a target projection;
- adding one or more guard bands to one or more edges that are discontinuous in the 2D frame but continuous in the 3D sphere, wherein said one or more guard bands are filled with padding data;
- applying a fade-out process to said one or more guard bands, wherein the fade-out process comprises blending said one or more guard bands with an overlapped region when the overlapped region exists and the fade-out process comprises blending said one or more guard bands with a predefined region when the overlapped region does not exist; and
- encoding the 2D frame extended with said one or more guard bands.

5. The method of claim 4, wherein said one or more guard bands are filled using geometry padding, and wherein the geometry padding extends samples outside said one or edges of the 2D frame using neighboring samples on the 3D sphere.

6. The method of claim 4, wherein said one or more guard bands are filled by extending boundary samples of said one or more edges.

7. The method of claim 4, wherein said one or more guard bands are filled with duplicated samples from respective edge areas of said one or more edges.

8. The method of claim 4, wherein the target projection corresponds to Equirectangular Projection (ERP), Cubemap Projection (CMP), Adjusted Cubemap Projection (ACP), Equal-Area Projection (EAP), Octahedron Projection (OHP), Icosahedron Projection (ISP), Segmented Sphere Projection (SSP), Rotated Sphere Projection (RSP), or Cylindrical Projection (CLP).

9. A method of processing 360-degree virtual reality images, the method comprising:
- receiving coded data for an extended 2D (two-dimensional) frame including an encoded 2D frame with one or more encoded faded guard bands, wherein the encoded 2D frame is projected from a 3D (three-dimensional) sphere using a target projection, wherein said one or more encoded faded guard bands are based on a blending of one or more guard bands with an overlapped region when the overlapped region exists and a blending of one or more guard bands with a predefined region when the overlapped region does not exist;
- decoding the coded data into a decoded extended 2D frame including a decoded 2D frame with one or more decoded faded guard bands; and
- deriving a reconstructed 2D frame from the decoded extended 2D frame.

10. The method of claim 9, wherein the reconstructed 2D frame is generated from the decoded extended 2D frame by cropping said one or more decoded faded guard bands.

11. The method of claim 9, wherein the target projection corresponds to Equirectangular Projection (ERP), Cubemap Projection (CMP), Adjusted Cubemap Projection (ACP), Equal-Area Projection (EAP), Octahedron Projection (OHP), Icosahedron Projection (ISP), Segmented Sphere Projection (SSP), Rotated Sphere Projection (RSP), or Cylindrical Projection (CLP).

* * * * *